(12) United States Patent
Ishikawa et al.

(10) Patent No.: US 7,504,057 B2
(45) Date of Patent: Mar. 17, 2009

(54) MANUFACTURING METHOD OF EXHAUST GAS PURIFYING FILTER

(75) Inventors: Satoshi Ishikawa, Anjo (JP); Mikio Ishihara, Kariya (JP); Kazuhide Sato, Aichi-ken (JP)

(73) Assignee: Denso Corporation, Kariya (JP)

( * ) Notice: Subject to any disclaimer, the term of this patent is extended or adjusted under 35 U.S.C. 154(b) by 381 days.

(21) Appl. No.: 11/362,208

(22) Filed: Feb. 27, 2006

(65) Prior Publication Data

US 2006/0197252 A1 Sep. 7, 2006

(30) Foreign Application Priority Data

Mar. 1, 2005 (JP) ............................. 2005-055908
Dec. 19, 2005 (JP) ............................. 2005-365254

(51) Int. Cl.
*D01D 5/24* (2006.01)
(52) U.S. Cl. .................... 264/209.3; 264/630; 264/631
(58) Field of Classification Search ............. 264/209.3, 264/630, 631
See application file for complete search history.

(56) References Cited

U.S. PATENT DOCUMENTS

| | | | | |
|---|---|---|---|---|
| 6,863,705 B2* | 3/2005 | Ishihara et al. | ................ | 55/523 |
| 6,972,045 B2* | 12/2005 | Itoh | ............................ | 55/523 |
| 7,001,442 B2* | 2/2006 | Nakatani et al. | ............... | 55/523 |
| 7,101,601 B2* | 9/2006 | Ishihara et al. | .............. | 428/116 |
| 7,204,965 B2* | 4/2007 | Okawara et al. | ............ | 422/177 |
| 2003/0041575 A1* | 3/2003 | Ishihara et al. | ................ | 55/523 |
| 2004/0018123 A1* | 1/2004 | Okawara et al. | ............ | 422/177 |
| 2004/0055264 A1* | 3/2004 | Itoh | ............................ | 55/523 |
| 2004/0071932 A1* | 4/2004 | Ishihara et al. | .............. | 428/116 |
| 2004/0239011 A1* | 12/2004 | Ishihara | ..................... | 264/628 |

FOREIGN PATENT DOCUMENTS

| | | |
|---|---|---|
| JP | 2004-42440 | 2/2004 |
| JP | 2004-82098 | 3/2004 |
| JP | 2004-154718 | 6/2004 |

* cited by examiner

*Primary Examiner*—Carlos Lopez
*Assistant Examiner*—Russell J Kemmerle, III
(74) *Attorney, Agent, or Firm*—Nixon & Vanderhye PC

(57) ABSTRACT

In a method of manufacturing an exhaust gas purifying filter that captures and purifies particulates involved in an exhaust gas emitted from an internal combustion engine, a honeycomb mold body of a desired length is firstly made by an extrusion molding step. In a sealing and enlarging step, tapered front parts of a multi-taper jig are inserted into the corresponding openings of the cells. The multi-taper jig is then oscillatory moved in a direction perpendicular to a longitudinal length of the ceramic mold body while heating the partition walls forming the cells, so that the opening of one cell is closed and sealed completely and the opening of the adjacent cell is enlarged in area. Finally, the honeycomb mold body is burned.

18 Claims, 11 Drawing Sheets

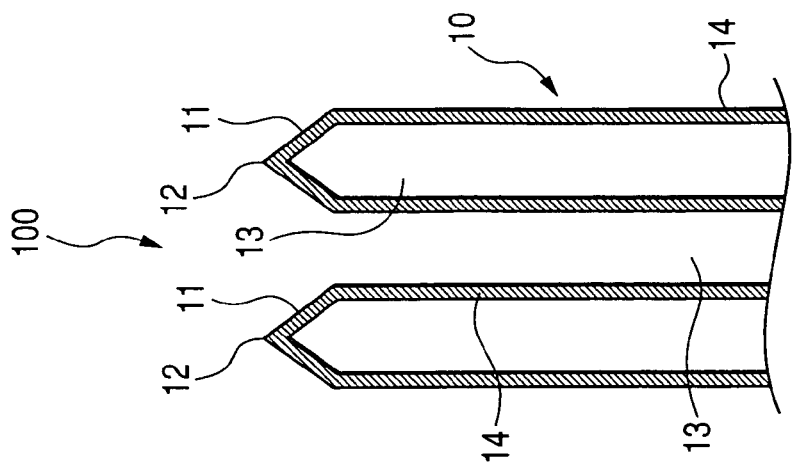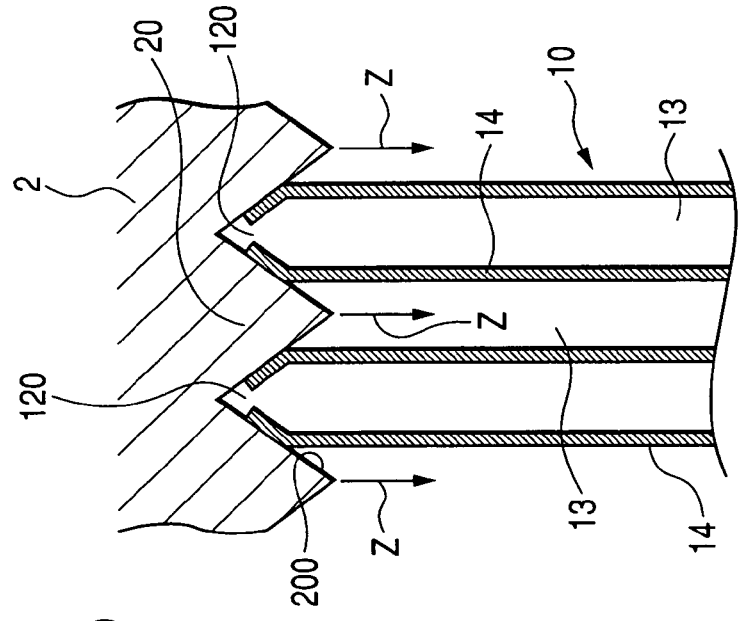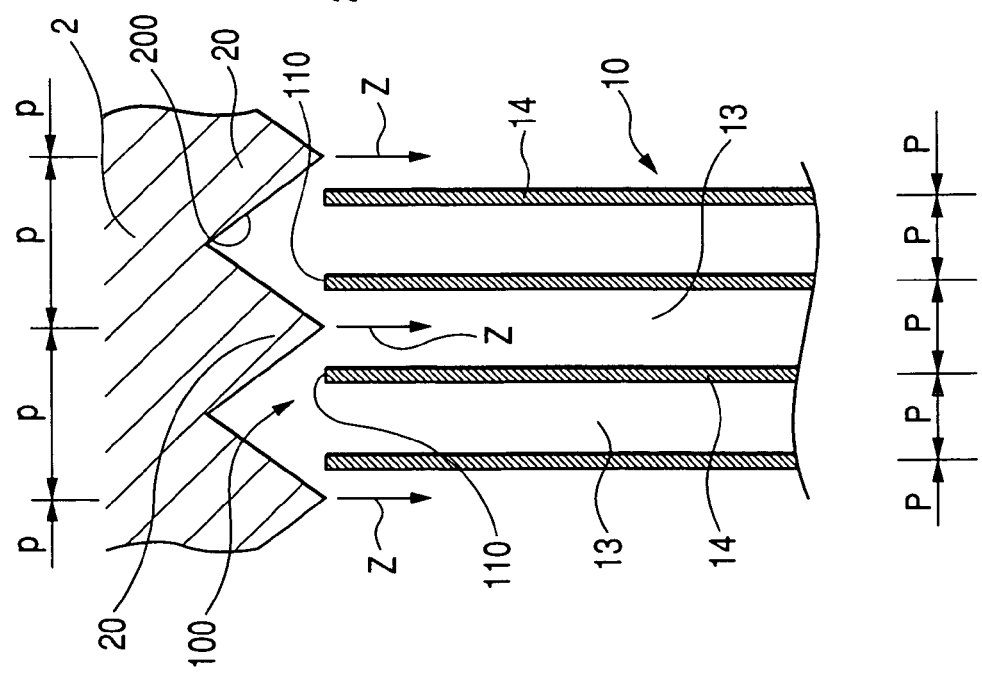

MANUFACTURING METHOD OF EXHAUST GAS PURIFYING FILTER

CROSS-REFERENCE TO RELATED APPLICATIONS

This application is related to and claims priority from Japanese Patent Applications No. 2005-55908 filed on Mar. 1, 2005 and No. 2005-365254 filed on Dec. 19, 2005, the contents of which are hereby incorporated by reference.

BACKGROUND OF THE INVENTION

1. Field of the Invention

The present invention relates to a method of manufacturing an exhaust gas purifying filter capable of capturing particulates such as fine carbon particles contained in an exhaust gas emitted from an internal combustion engine and purifies the captured particulates.

2. Description of the Related Art

As shown in FIG. 14, an exhaust gas purifying filter 9 of a related art has been well known. The exhaust gas purifying filter 9 captures and purifies particulates such as fine carbon particles contained in an exhaust gas 8 emitted from an internal combustion engine such as a diesel engine.

On purifying the exhaust gas 8 emitted from the internal combustion engine, the exhaust gas 8 is introduced through each opening 91 of a large size in plural cells 93 at one end surface 900 of the exhaust gas purifying filter 9. The exhaust gas 8 introduced in one cell 93 then passes through partition walls 94 formed between one cell and the adjacent cell 93 and is emitted to the outside through the openings 91 of a large size of the adjacent cell 93 formed on the other end surface of the exhaust gas purifying filter 9

As shown in FIG. 15A to FIG. 15C, a manufacturing method of the related art has been proposed by the Japanese patent laid open publication NO. 2004-42440. The manufacturing method of the related art deforms the partition wall 94 of each cell 93 by using a taper jig in order to form the opening 91 of a large size (as a large opening 91).

First, an extrusion molding of ceramic raw materials including organic binders is performed in order to form a ceramic mold body. Then, the ceramic mold body is dried and then cut into a plurality of honeycomb structure mold bodies 90. As shown in FIG. 15C, each honeycomb structure mold body 90 has a plurality of the cells 93 formed between partition walls 94. Each cell 93 penetrates the honeycomb structure body 90 in its longitudinal direction. That is, the one end of each cell 93 in the honeycomb structure mold body 90 has the opening 910. The openings 910 are formed in a honeycomb structure on each end surface 900 of the honeycomb mold body 90.

Following the above steps, as shown in FIG. 15A and FIG. 15B, a taper jig 7 is inserted in the direction W into the opening 910 of each cell 93 in the honeycomb structure body 90. The openings 910 are thereby deformed by the pressure stress applied by the taper jig 7 while the partition walls 94 are heated in order to soften them. As a result, the opening 91 of a large size (as a large opening) is formed by enlarging the area of the opening 910 of each cell 93 and the opening 92 of a small size (as a small opening) is also formed by closing the opening 910 of each adjacent cell, as shown in FIG. 15C.

Finally, a seal member 920 (see FIG. 14) is formed at the small opening 92. Thereby, the manufacturing process of forming the honeycomb structure body 9 is completed.

Because the exhaust gas purifying filter 9 has a large opening 91 of a large size, it is possible to adequately keep the area of the opening of the cell 93 that is required for introducing and purifying the exhaust gas, even if the particulate involved in the exhaust gas is accumulated on the opening on the end surface 900 of the exhaust gas purifying filter 9.

Furthermore, because the total area of the partition walls 94, that acts as a filter through which the exhaust gas passes, can be increased by decreasing the size of the openings 92 in which the plug member 920 is embedded or sealed, it is possible to increase the efficiency of the honeycomb filter for purifying the exhaust gas.

However, because the taper jig 7 of the related art has only a front end part 70, and it is necessary to deform the openings 910 of the cells 93 in the honeycomb structure body 90 by the taper jig 7 every opening 910, it is necessary to perform many manufacturing steps in order to deform all of the openings 910 of the cells 93, so that it needs much time to manufacture the exhaust gas purifying filter 9. Thus, the related art increases the total manufacturing cost for the exhaust gas purifying filter 9.

SUMMARY OF THE INVENTION

It is an object of the present invention to provide a new and improved method of manufacturing the exhaust gas purifying filter efficiently with low manufacturing cost.

To achieve the above purpose, the present invention provides a manufacturing method of an exhaust gas purifying filter having following steps. An extrusion molding with ceramic raw materials including organic binder is performed in order to form a honeycomb structure body of a desired length having a plurality of partition walls forming a plurality of cells in a honeycomb structure, and both ends of each cell having openings. A multi-taper jig having a plurality of tapered front parts is inserted into the corresponding openings of the cells arranged on one end surface of the honeycomb mold body. The multi-taper jig is moved by an oscillatory motion or vibration in a direction perpendicular to an axis of the honeycomb mold body so as to enlarge the opening of one cell and to seal the opening of the adjacent cell arranged on the end surface of the honeycomb mold body while heating the partition walls. Finally, the honeycomb mold body is burned.

Further, the present invention provides a manufacturing method of an exhaust gas purifying filter for capturing particulates involved in an exhaust gas emitted from an internal combustion engine having following steps. An extrusion molding with ceramic raw materials including organic binder is performed in order to form a mold body. The mold body is dried and cut into a plurality of honeycomb mold bodies of a desired length. Each honeycomb mold body has a plurality of partition walls that form a plurality of cells arranged in a honeycomb structure and both ends of each cell has openings. A cell pitch of the cells is measured based on an image of one end surface of the honeycomb mold body. An optimum multi-taper jig is selected in a plurality of multi-taper jigs that being prepared in advance. Those multi-taper jigs have different pitches of a plurality of tapered front parts. The selected multi-taper jig has a pitch of the tapered front parts being equal to the measured cell pitch of the honeycomb mold body. The tapered front part of the selected optimum multi-taper jig is inserted into the corresponding openings of the cells arranged on one end surface of the honeycomb mold body so as to enlarge the opening of one cell and to seal the opening of the adjacent cell arranged on the end surface of the honeycomb mold body while softening and deforming the partition walls by heating them. Finally, the honeycomb mold body is burned.

BRIEF DESCRIPTION OF THE DRAWINGS

A preferred, non-limiting embodiment of the present invention will be described by way of example with reference to the accompanying drawings, in which:

FIG. 2A is a sectional view showing partition walls of the ceramic honeycomb structure body before the deformation in the sealing and enlarging step;

FIG. 2B is a sectional view showing the deformation of the partition walls of the ceramic honeycomb structure body during the sealing and enlarging step;

FIG. 2C is a sectional view showing the partition walls of the ceramic honeycomb structure body after the deformation in the sealing and enlarging step;

DETAILED DESCRIPTION OF THE PREFERRED EMBODIMENTS

Figure 1:
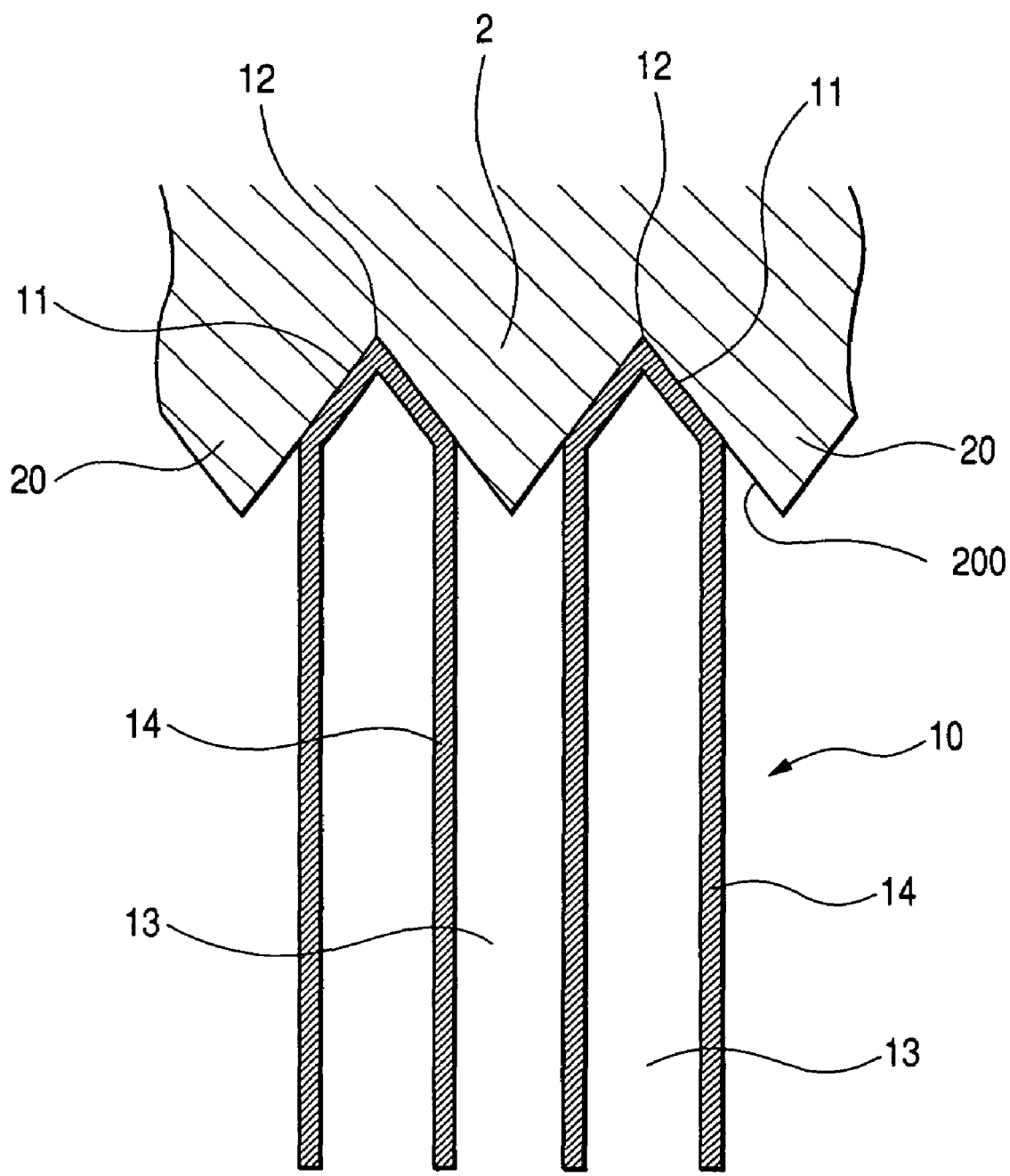
FIG. 1 is a cross section of a honeycomb structure body and a multi taper jig in a sealing and enlarging step of sealing one end surface of cells in the ceramic honeycomb structure body according to the first embodiment of the present invention.

Hereinafter, various embodiments of the present invention will be described with reference to the accompanying drawings. In the following description of the various embodiments, like reference characters or numerals designate like or equivalent component parts throughout the several views.

First Embodiment

A description will now be given of the method of manufacturing the exhaust gas purifying filter of the first embodiment according to the present invention with reference to FIG. 1 to FIG. 8.

Figure 8:
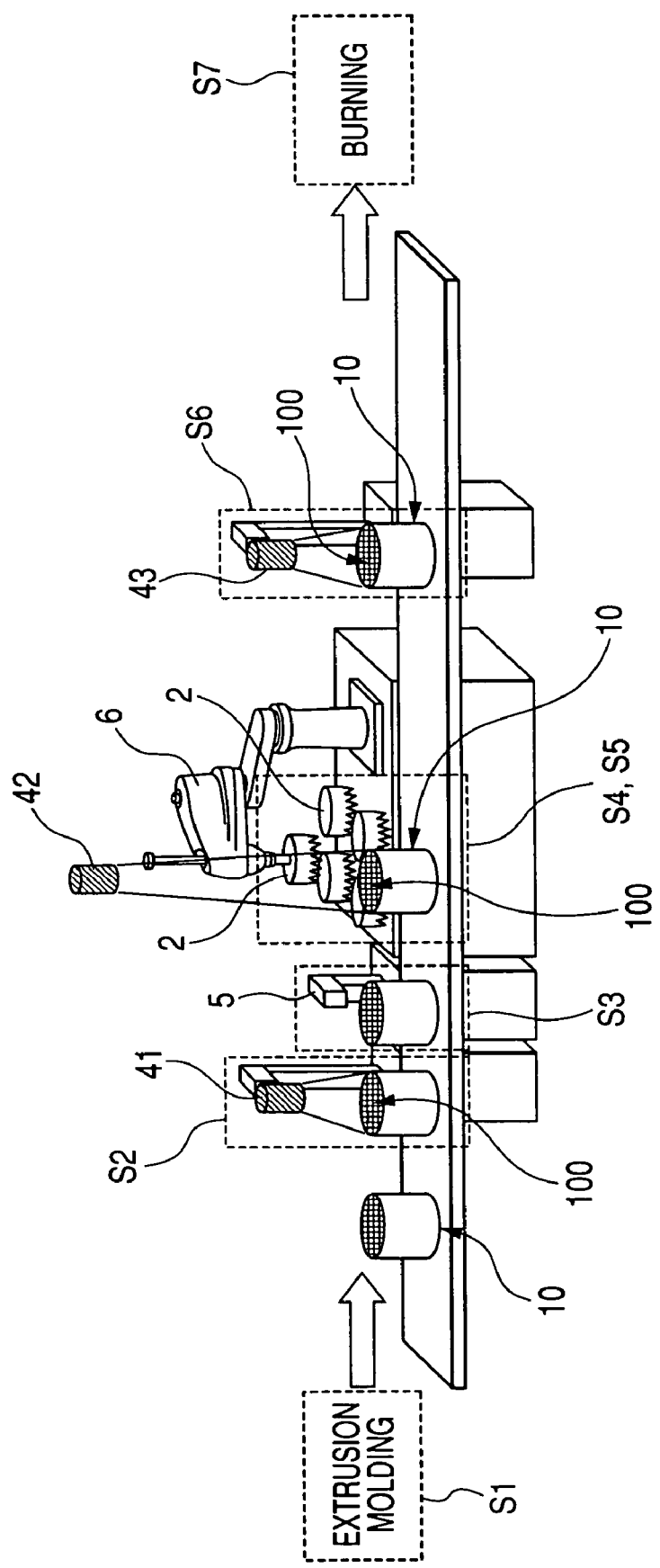
FIG. 8 shows an entire flow of the steps in the method of manufacturing the exhaust gas purifying filter according to the present invention.

As shown in FIG. 8, the method of manufacturing the exhaust gas purifying filter 1 of the first embodiment includes an extrusion molding step (step S1), a cell pitch measuring step (step S2), a jig selection step (step S4), a sealing and enlarging step (step S5), and a burning step (step S7).

Figure 4:
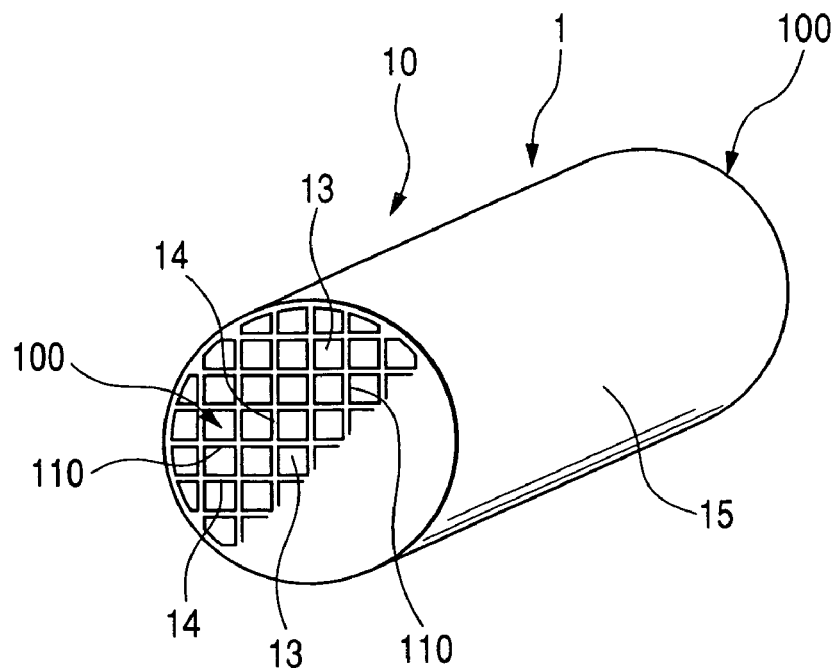
FIG. 4 is a perspective view of the honeycomb structure body according to the first embodiment of the present invention.

First, in the extrusion molding step (as the step S1), an extrusion molding is performed with ceramic raw material involving an organic binder and a thermoplastic resin so as to make a ceramic mold body, and performs drying and cutting. In the drying step, the ceramic mold body is dried. In the cutting step, the ceramic mold body is cut into a plurality of a ceramic honeycomb structure mold bodies. Each body has a given length. As shown in FIG. 2A and FIG. 4, the ceramic honeycomb structure mold body 10 has a plurality of partition walls 14 and a plurality of cells 13 formed by the 20 partition walls 14 in honeycomb structure. Both the end parts 100 of each cell 13 are open. The ceramic honeycomb structure mold body 10 will be referred to as the honeycomb mold body 10. The outer peripheral part of the honeycomb mold body 10 is covered with an external skin part 15 of a cylinder shape.

Next, as shown in FIG. 8, in the cell pitch measuring step (step S2), a CCD camera 41 measures a cell pitch P of the cell arrangement on one end surface 100 of the honeycomb mold body 10.

In the following jig selection step (step S4), the optimum multi-taper jig 2 is selected that is mostly suitable for the cell pitch P of the cells 13 in the honeycomb mold body 10 measured in the cell pitch measuring step (step S2). As shown in FIG. 2A, the selected multi-taper jig 2 of the cell pitch p is approximately twice of the cell pitch P of the cell arrangement on the end surface of the ceramic mold body 10.

In the embodiment, as shown in FIG. 8, plural types of the multi-taper jigs 2 are prepared in advance, the tapered front part 20 of each multi-taper jig 2 has a different pitch p. For example, when four types of the multi-taper jigs 2 are prepared in advance, the pitch p of the tapered front part of those multi-taper jigs are 2.74 mm, 2.84 mm, 2.94 mm, and 3.04 mm, respectively.

Although there are in general variations of the cell pitch P of the cell arrangement on the end surface of the ceramic mold body 10, the mean value of the cell pitches of the cells 13 on the arrangement measured is determined and used as the cell pitch P of the entire cells 13 in the ceramic honeycomb mold body 10.

In the present embodiment, a maximum width of the oscillatory motion by the multi-taper jig 2 to be used in the sealing and enlarging step (step S5) is determined based on the values of the cell pitches of the cells 13 measured in the cell pitch measuring step (step S2).

In the sealing and enlarging step (step S5), as shown in FIG. 2A and FIG. 2B, the tapered front parts 20 of the multi-taper jig 2 selected in the jig selection step (step S4) are inserted in the direction Z into the openings 110 of the plural cells 13 in the ceramic honeycomb mold body 10 at a time. The inserting speed of the multi-taper jig 2 is approximately 0.001 to 10 mm/sec counted from the time at which the tapered front parts 20 of the multi-jig 2 are contacted with the openings 110 of the ceramic honeycomb mold body 10 to the time of the completion of the insertion of the multi-taper jig 2. The inserting speed of the multi-taper jig 2 is the speed to deform the front part of each partition wall 14 after the partition walls 14 are heated adequately so that the organic binders involved in the ceramic honeycomb mold body 10 is not thermally decomposed. It is preferred to set the inserting speed of the multi-taper jig 2 to 0.01 to 1 mm/sec.

As shown in FIG. 1, FIG. 2A to FIG. 2C, and FIG. 3A to FIG. 3D, the heating to the ceramic honeycomb mold body 10 is performed so as to soften and deform the partition walls 14. As a result, the opening 110 of one cell 13 is enlarged so as to form a large opening 11 and the opening 110 of the adjacent cell 13 is closed so as to seal the one end of and to form the sealed part of the adjacent cell 13.

During the deformation, namely the oscillatory motion, the range of temperature of the partition walls 14 is approximately 100 to 500° C. This temperature range is the condition so that the organic binder is not thermally decomposed and the partition walls 14 are adequately softened.

That is, on deforming the partition walls 14 of the ceramic honeycomb mold body 10, because it is necessary to heat and soften the organic binder moderately. In particular, the stress generated by the oscillatory motion of the multi-taper jig 2 must be applied vertically to the partition walls 14, it is important to control the temperature of the partition walls 14 to the optimum temperature during the sealing and enlarging step (step S5) so as to adequately soften the organic binder involved in the ceramic honeycomb mold body. The organic binder starts to be softened not less than 100° C., and adequately softened not less than 300° C. On the contrary, the organic binder starts to be thermally decomposed over 450° C. and highly decomposed over 500° C. Therefore, it is preferred to set the temperature of the partition walls 14 to a range between 300 to 450° C.

As shown in FIG. 8, a robot 6 holds and moves the multi-taper jig 2 selected in the jig selection step (step S4) and the sealing and enlarging step (step S5). In the sealing and enlarging step (step S5), the robot 6 moves the multi-taper jig 2 toward the direction perpendicular to the axis of the ceramic honeycomb mold body 10.

Figure 3A:
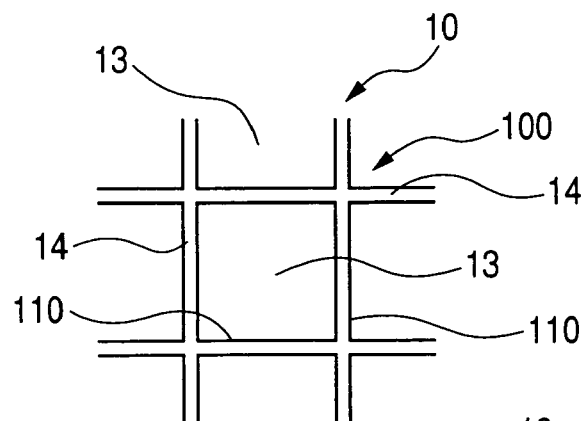
FIG. 3A is a front view of one end surface of the honeycomb structure body before the deformation of the partition walls corresponding to FIG. 2A.
Figure 3B:
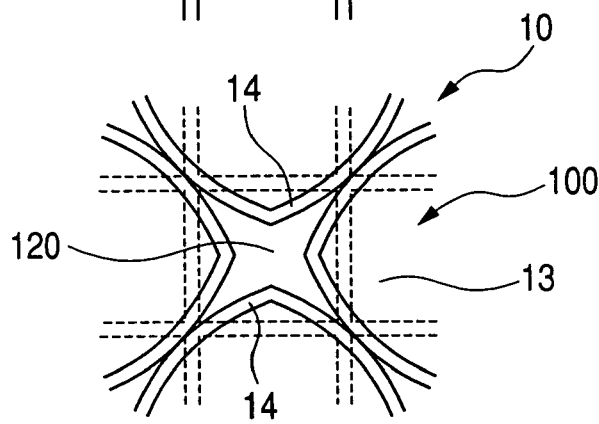
FIG. 3B is a front view of one end surface of the honeycomb structure body at which the opening is sealed by the deformation of the partition walls to which the multi taper jig is inserted through the openings, as corresponding to FIG. 2A.
Figure 3C:
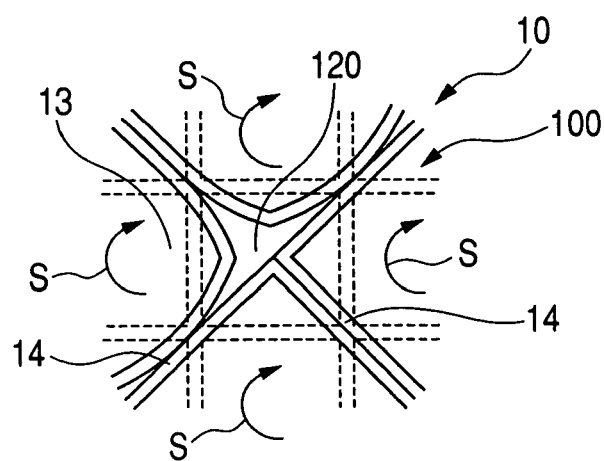
FIG. 3C is a front view of one end surface of the honeycomb structure body where the multi-taper jig oscillatory moves halfway around a circle in the clockwise direction.

The oscillatory motion of the multi-taper jig 2 is performed in a clockwise direction designated by the arrow S in FIG. 3C. The maximum width of the oscillatory motion of the multi-taper jig 2 is in a range of 0.001 times to 0.5 times of the cell pitch P of the cells 13 (Hereinafter referred to as "0.001 P to 0.5 P"). That is, the robot 6 moves the multi-taper jig 2 so that the multi-taper jig 2 traces a circle in a clockwise direction designated by the arrow S with a diameter of 0.001 P to 0.5 P on a plane that is perpendicular to the axis of the ceramic honeycomb mold body 10. At this time, the speed of the oscillatory motion of the multi-taper jig 2 is 0.001 to 10 mm/sec in the direction perpendicular to the through hole of the cell 13. This speed of the oscillatory motion is the speed so that the partition walls 14 are deformed adequately under the condition in which the organic binders involved in the ceramic honeycomb mold body 10 is not thermally decomposed. On considering the above condition, it is further preferred to set the oscillatory motion of the multi-taper jig 2 is 0.01 to 1 mm/sec.

When the robot 6 moves the multi-taper jig 2 so that the multi-taper jig 2 traces a circle, the press stress by the tapered front parts 20 is applied to all of the directions to the partition walls 14. This can form the complete sealed parts of the cells without generation of incline forces to the partition walls.

Figure 6:
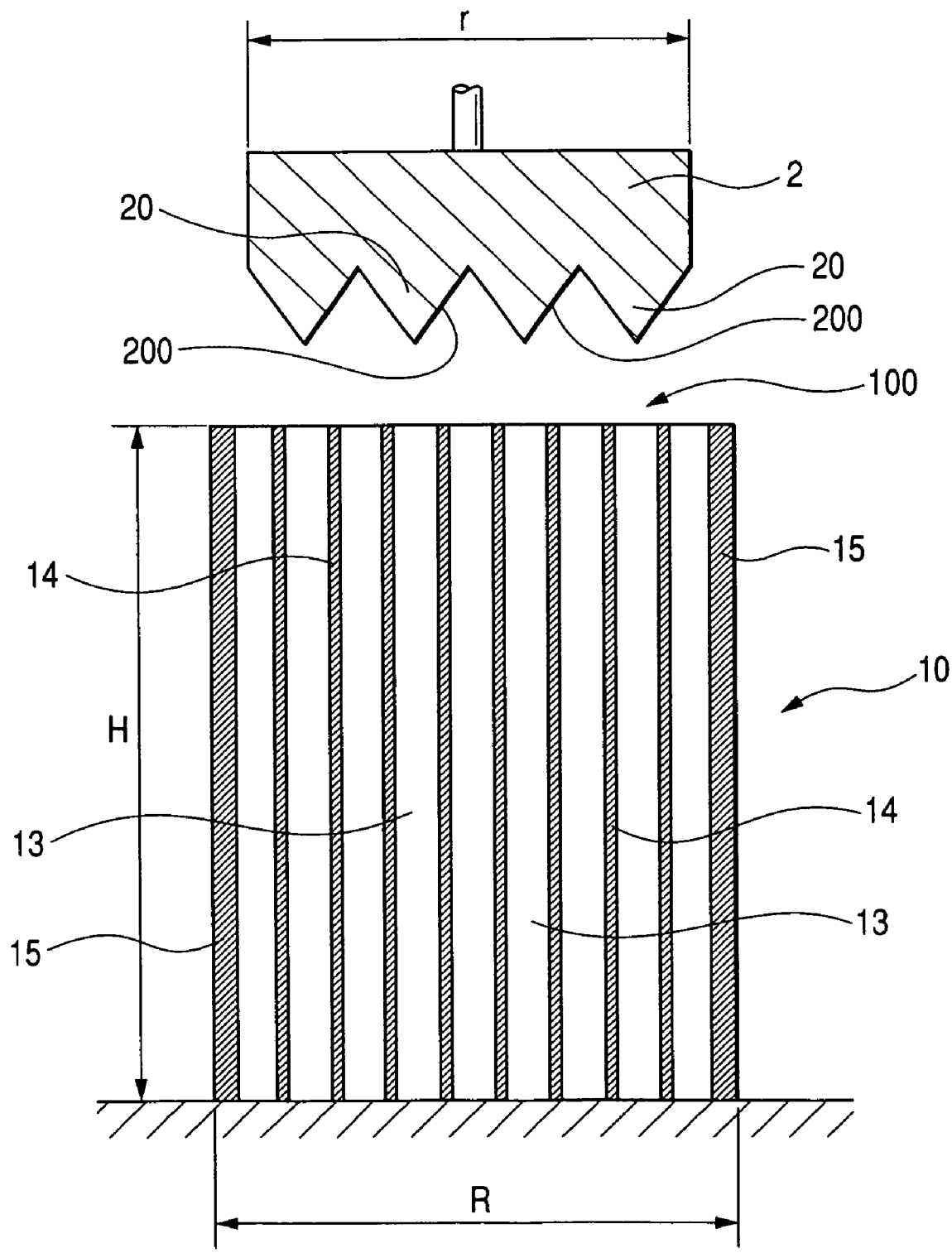
FIG. 6 is a cross section of the honeycomb structure body before the deformation of the partition walls in the sealing and enlarging step according to the first embodiment.

Further, as shown in FIG. 6 and FIG. 8, after the completion of the cell pitch measuring step (step S2) and before the initiation of the sealing and enlarging step (step S5), the longitudinal length H of (or in the axis direction of) the ceramic honeycomb mold body 10 is measured (step S3). The robot 6 controls the moving distance of the multi-taper jig 2 in the axis direction during the sealing and enlarging step (step S5) according to the measured longitudinal length H of the ceramic honeycomb mold body 10. In the present invention, the axis direction means the longitudinal direction of each cell 13.

The measuring device 5 measures the longitudinal length H of the ceramic honeycomb mold body 10. The surface 200 of the tapered front part 20 of the multi-taper jig 2 is covered with a mold releasing agent.

Figure 5:
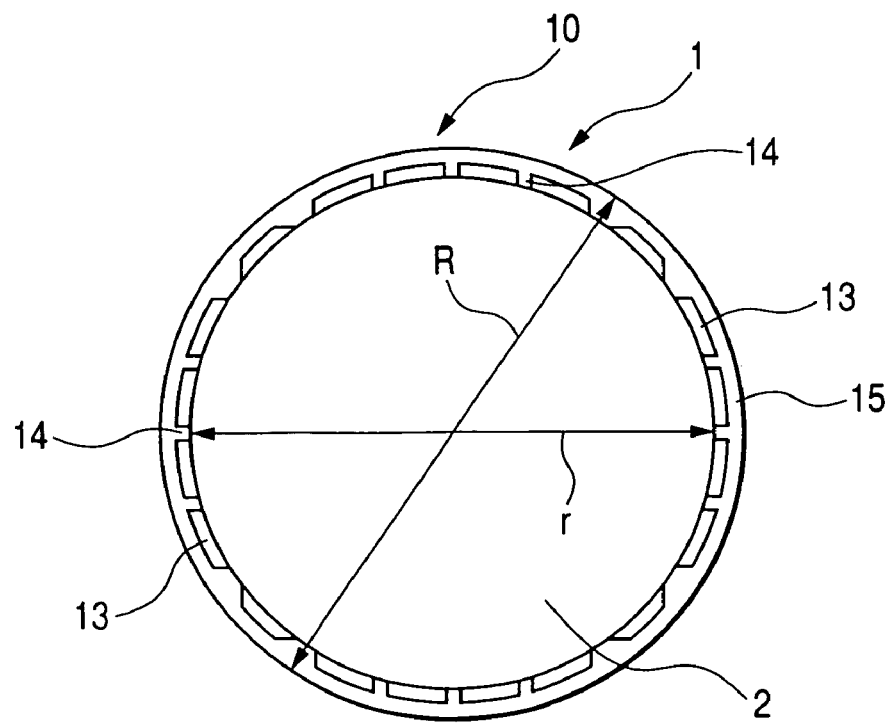
FIG. 5 is a diagram showing one end surface of the honeycomb structure body during the sealing and enlarging step of deforming the partition walls by using the multi taper jig according to the first embodiment.

As shown in FIG. 5 and FIG. 6, the outside diameter "r" of the multi-taper jig 2 is smaller than the outside diameter "R" of the ceramic honeycomb mold body 10. FIG. 5 and FIG. 6 show the ceramic honeycomb mold body 10 having a small number of the cells 13 for simplification.

The ceramic raw material involves the organic binders and the thermoplastic resin. Organic methyl cellulose is used as the organic binder. Acrylic resin is used as the thermoplastic resin.

It is possible to use as the organic binder hydroxyl methyl cellulose and others instead of the organic methyl cellulose.

It is possible to use as the thermoplastic resin methyl stearate, polyvinyl chloride, or vinyl chloride resin instead of the acrylic resin.

The exhaust gas purifying filter manufactured by the method according to the present invention can be applied to an internal combustion engine such as a diesel engine.

The tapered front part 200 of the multi-taper jig 2 has a shape of a quadrangular pyramid. As will be explained later in the description of the third embodiment, the tapered front part 200 of the multi-taper jig 2 has a shape of a quadrangular pyramid, a hexagon pyramid, and a corn.

In the sealing and enlarging step (step S5), the front parts 200 of the multi-taper jig 2 are inserted into the openings 110 of the cells 13 at a time while the position of the opening 110 is recognized and obtained as image data by a CCD camera 42, as shown in FIG. 8.

As shown in FIG. 8, an examination step (step S6) is performed after the sealing and enlarging step (step S5) and before the burning step (step S7). In the examination step (step S6), the appearance of the ceramic honeycomb mold body 10 is examined while taking the appearance of the ceramic honeycomb mold body 10 by a CCD camera 43. If an aperture 120 is generated in the sealed part 12 formed on one end surface of the cells 13 or there is a defect in shape of the partition wall 14 or of the external peripheral skin portion 15 of the exhaust gas purifying filter, the exhaust gas purifying filter is in out of use without performing the burning step (step S7). This can decrease the total amount of thermo energy necessary for performing the manufacturing method.

After the completion of the sealing and enlarging step (step S5) and until the initiation of the sealing for a following honeycomb mold body, a cleaning is performed for the multi-taper jig 2. It is acceptable to perform this cleaning step every work, namely every a ceramic honeycomb mold body, or every several works. It is also acceptable to perform the above cleaning step when an operator detects or notices that foreign substances are attached on the surface 200 of the front part of the multi-taper jig 2. It is also acceptable to perform the cleaning by blowing air or by jet blower with water and drying.

Figure 7:
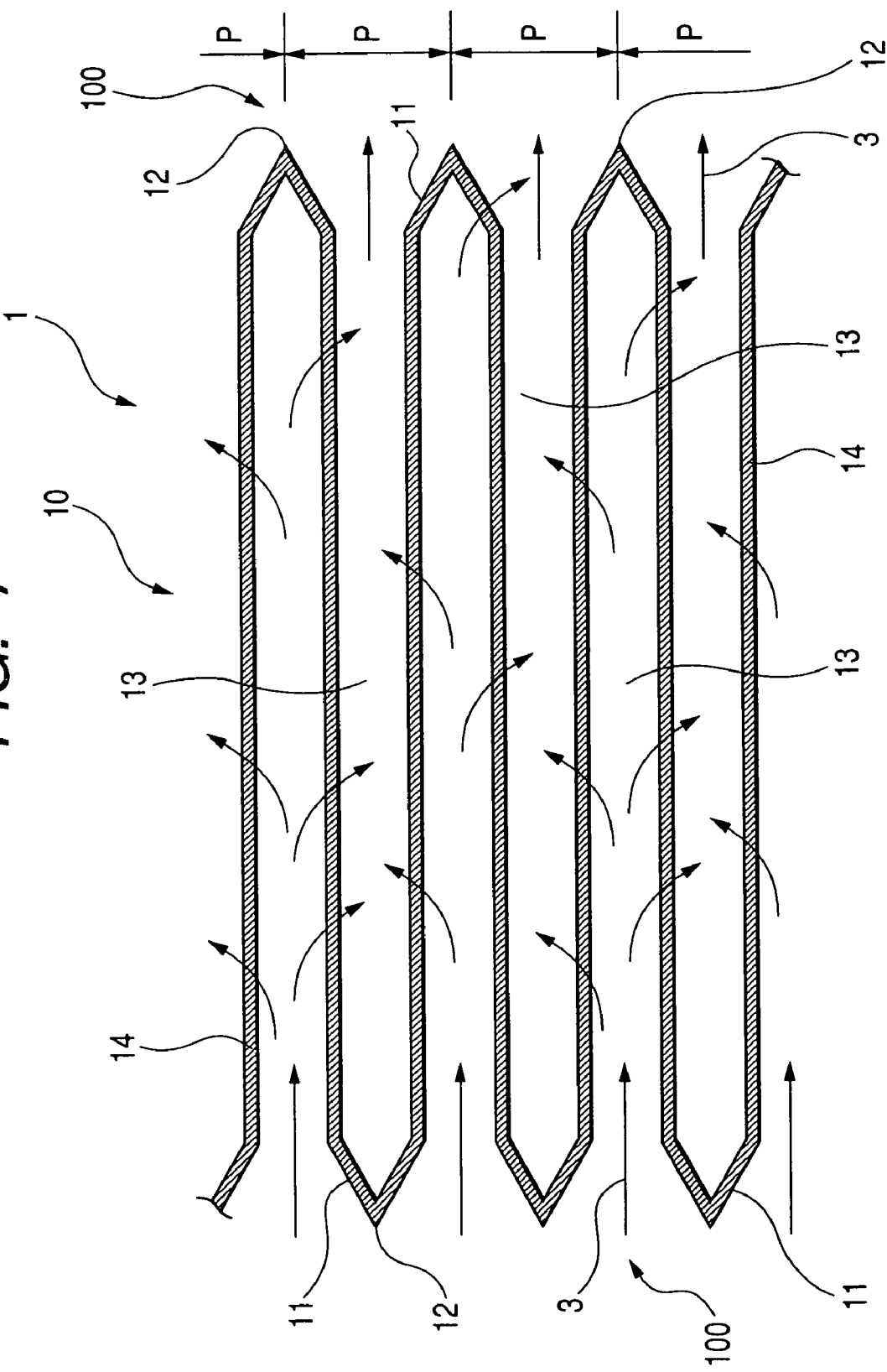
FIG. 7 is a cross section of the honeycomb structure body after the deformation in the sealing and enlarging step according to the first embodiment.

The multi-taper jig 2 is so formed that the deformation of all of the partition walls 14 on one surface 100 of the ceramic honeycomb mold body 10 can be performed at a time. The sealing and enlarging step is then performed for the other end surfaces of the ceramic honeycomb mold body 10. That is, the sealing and enlarging step (step S5) performs the deformation of the partition walls 14 on both end surfaces 100 of the ceramic honeycomb mold body 10. As a result of the sealing and enlarging step (step S5), each cell 13 has the large openings 11 at one end surface thereof and the sealed part at the other end surface thereof, as shown in FIG. 7. The large openings 11 and the sealed parts 12 are alternately formed in a honeycomb structure on each end surface 100 of the ceramic honeycomb mold body 10.

As shown in FIG. 7, in the exhaust gas purifying filter according to the embodiment made from the ceramic honeycomb mold body 10, the exhaust gas 3 emitted from an internal combustion engine (not shown) is introduced into the cell 13 through the large opening 100 thereof and then flows into the adjacent cell 13 through the partition wall 14. The partition walls 14 formed between adjacent cells 13 captures, namely absorbs particulates such as carbon particles involved in the exhaust gas 3.

For example, the partition walls 14 involving catalysts such as platinum can capture and decompose particulates such as carbon particulates from the exhaust gas.

The exhaust gas purified by the partition walls 14 are emitted from the large openings 11 of the cells 13 to the outside of the exhaust gas purifying filter 1.

Next, a description will now be given of the action and effects of the method of manufacturing the exhaust gas purifying filter of the present embodiment.

The multi-taper jig 2 has a plurality of the tapered front parts 20 arranged in parallel vertically and horizontally, namely in a honeycomb structure corresponding to the openings 110 of the cells of the ceramic honeycomb mold body 10. Accordingly, the all of the partition walls 14 of the plural cells 13 are decomposed by using the multi-taper jig 2 at a time. This can reduce the total number of steps in the manufacturing form the exhaust gas purifying filter of the present invention and also reduce the total manufacturing cost. Thus, the manufacturing method of the present invention can provide the exhaust gas purifying filter with a low cost.

The large opening 11 and the sealed part 12 are formed on both the end surfaces of the ceramic honeycomb mold body 10. Even if the particulates are accumulated on the inlet part of the cells 13, the exhaust gas can be easily and efficiently introduced into the cells 13 and exhausted to the outside through the large openings 11 of a large area.

Because the sealed part 12 is made of the partition walls 14, it is possible to increase the total area of the partition walls 14 that act as the particulate filter. This can enhance the efficiency of purifying the exhaust gas. Thus, the present invention can provide the exhaust gas purifying filter with a superior purifying capability.

On the other hand, the extrusion molding step in the manufacturing method also provides a ceramic honeycomb mold body 10 involving a minor variation of the cell pitch P of the cells 13. In this case, the tapered front parts 20 of the multi-taper jig 2 do not match adequately the corresponding partition walls 14 even if the jig 2 moves up and down to the axis of the ceramic honeycomb mold body 10. The un-matching between the pitch p of the tapered front part 20 and the cell pitch P of the cells 13 (or of the partition walls 14) introduces the generation of an aperture 120 in the sealed part of the cell 13, as shown in FIG. 2B and FIG. 3B. In order to avoid the occurrence of the above un-matching, the manufacturing method of the embodiment includes both the cell pitch measuring step (step S2) and the jig selection step (step S4). Even if the extrusion molding step produces the ceramic honeycomb mold body 10 having a minor variation of the cell pitch P of the cells 13, the manufacturing method of the present embodiment can form the large opening 11 and the sealed part 12 in the ceramic honeycomb mold body 10 certainly.

Further, in the sealing and enlarging step (step S5), as shown in FIG. 2A to FIG. 2C and FIG. 3A to FIG. 3D, each tapered front part 20 of the multi-taper jig 2 is inserted into the corresponding opening 110 of each of the plural cells 13 and the multi-taper jig 2 then moved in the direction perpendicular to the axis of the ceramic honeycomb mold body 10. Thereby, even if the cell 13 of the ceramic honeycomb mold body 10 have the minor variation of the cell pitch P, the sealing and enlarging step (step S5) can form the sealed part 12 of the cell 13 certainly without generating the aperture 120.

A concrete example of the above feature will be explained with reference to FIG. 3A to FIG. 3D.

Figure 3D:
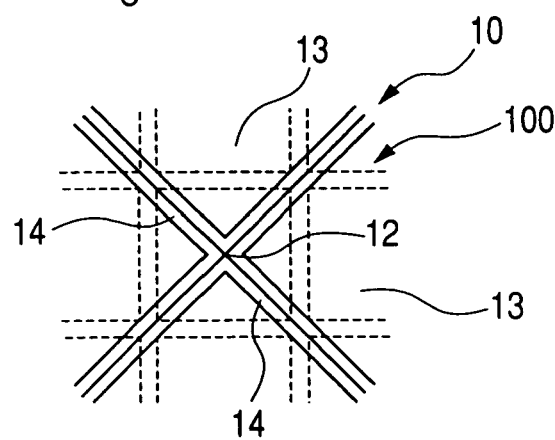
FIG. 3D is a front view of one end surface of the honeycomb structure body after deformation of the partition walls in the sealing and enlarging step.

First, when the tapered front part 20 of the multi-taper jig 2 is inserted into the corresponding opening 110 of the cell 13, the partition wall 14 is deformed as shown in FIG. 3B. However, there is a possibility to generate the aperture 120 only by the insertion of the multi-taper jig 2 into the opening 110 of the cell 13. In order to eliminate the possibility to generate the aperture 120, the manufacturing method of the present embodiment performs the oscillatory motion of the multi-taper jig 2 in the opening 110 of the cell 13. As a result, as shown in FIG. 3C and FIG. 3D, the partition walls 14 are contacted to each other completely and the sealed part of the cell 13 is generated. Thus, the manufacturing method of the present embodiment can form the sealed part 12 of the cell 13 completely by adding the oscillatory motion of the multi-taper jig 2 in the direction perpendicular to the axis of the ceramic honeycomb mold body 10, and can present the generation of the aperture part 120 in both the end surfaces of the ceramic honeycomb mold body 10.

Further, because the manufacturing method of the present embodiment can form the sealed part 12 completely without generating any aperture part 120, it is possible to eliminate the step to form seal members on the sealed part 12 of the cell 13. It is therefore possible to increase the productivity and to manufacture the exhaust gas purifying filter 1 with a low cost.

The oscillatory motion of the multi-taper jig 2 is performed in a clockwise direction designated by the arrow S shown in FIG. 3C. This circular tracing motion by the tapered front part 20 of the multi-taper jig 2 can apply the uniform stress to the partition wall 14 in the all directions and deform the partition wall 14 without producing eccentric stress, and form the sealed part 12 of the cell 13 certainly.

The maximum width of the oscillatory motion is 0.001 to 0.5 times of the cell pitch P of the cells 13. It is possible to perform the oscillatory motion of the multi-taper jig 2 with certainty and avoid any damage applied to the partition wall 14 and to form the large opening 11 and the sealed part 12 in the cell 13 and to provide the exhaust gas purifying filter 1 with a superior purifying capability.

If the maximum width of the oscillatory motion of the multi-taper jig 2 is less than 0.001 times of the cell pitch P, it is difficult to obtain the effect of the oscillatory motion by the multi-taper jig 2. Further, if the maximum width of the oscillatory motion of the multi-taper jig 2 is over 0.5 times of the cell pitch P, there is a possibility to damage the large openings and the sealed parts of the cells 3 because the partition walls 14 are greatly deformed. In the present invention, the cell pitch P means the distance between adjacent cells, namely the distance between the center positions of the adjacent partition walls.

Furthermore, the manufacturing method of the present embodiment involves the step S3 of measuring the longitudinal length H of each ceramic honeycomb mold body 10 in the axis direction after the extrusion molding step (step S1) and before the sealing and enlarging step (step S5). The magnitude of moving of the multi-taper jig 2 in the axis direction of the ceramic honeycomb mold body 10 during the sealing and enlarging step S5 is controlled according to the longitudinal length H measured in the step S3.

It is thereby possible to control the magnitude of movement of the multi-taper jig 2 in the axis direction according to the longitudinal length H of the ceramic honeycomb mold body 10 in the axis direction thereof and as a result to form the large opening 11 and the sealed part 12 certainly and preciously.

Even if there is a variation of the longitudinal length H in the axis direction of the ceramic honeycomb mold body 10, it is possible to form the sealing of the cell 13 certainly.

Furthermore, the surface 200 of the tapered front part 20 of the multi-taper jig 2 of the present embodiment is covered with a mold releasing agent. It is thereby possible to release the multi-taper jig 2 easily from the ceramic honeycomb mold body 10 without causing any damage or unnecessary deformation to the sealed parts 12 and the partition walls 14 of the cells 13 after the formation of them.

The multi-taper jig 2 has a diameter "r" that is smaller than the diameter "R" of the ceramic honeycomb mold body 10. It is thereby possible to prevent any damage to the external peripheral skin part 15 formed or covered on the external peripheral surface of the ceramic honeycomb mold body 10.

It is preferred that the external diameter "r" of the multi-taper jig 2 is 2 to 20 mm smaller than the external diameter "R" of the honeycomb mold body 10. This can avoid any damage to the external skin part 15 of the honeycomb mold body.

On the other hand, if a difference between the external diameter "r" of the multi-taper jig 2 and the external diameter "R" of the honeycomb mold body 10 is not more than 2 mm, there is a possibility of damaging the external skin part 15 of the honeycomb mold body.

Further, if a difference between the external diameter "r" of the multi-taper jig 2 and the external diameter "R" of the honeycomb mold body 10 is over 20 mm, there is a possibility of increasing the number of the cells 13 having no sealed part or no large opening. This reduces the efficiency of the purifying function of the exhaust gas purifying filter. Or, the manufacturing cost will increases because it is necessary to perform an additional sealing step to form the sealed part on the cells 13 having no sealed parts.

The maximum width of the oscillatory motion of the multi-taper jig 2 to be used in the sealing and enlarging step (step S5) is determined based on the measured value of the cell pitch P of the cells 13 obtained in the cell pitch measuring step (step S2). It is thereby possible to form the large opening 11 and the sealed part 12 with certainty without causing damage to the partition wall 14 of the cell 13.

Moreover, the temperature of the partition wall 14 to be deformed by the multi-taper jig 2 is set to a range of 100 to 500° C. during the oscillatory motion, it is possible to adequately soften the organic binder involved in the ceramic honeycomb mold body 10. It is further possible to form the sealed part 12 certainly and easily, and also possible to keep the ceramic honeycomb mold body 10 in a desired shape after the completion of the sealing and enlarging step (step S5).

Still moreover, because the inserting speed to insert the tapered front parts 20 of the multi-taper jig 2 into the corresponding cells formed by the partition walls 14 through the openings and the speed of the oscillatory motion of the multi-taper jig 2 are the same speed, 0.001 to 10 mm /sec, it is possible to prevent the generation of defects such as cracks in the ceramic honeycomb mold body 10 and to keep the ceramic honeycomb mold body 10 with a given shape after the completion of the sealing and enlarging step (step S5).

If the inserting speed of the tapered front parts of the multi-taper jig 2 is less than 0.001 mm/sec, there is a possibility to keep the honeycomb mold body in a desired shape after the sealing and enlarging step because the organic binders involved in the honeycomb mold body are excess heated and deformed. Furthermore, the inserting speed of the tapered front parts of the multi-taper jig 2 is over than 10 mm/sec, there is a possibility to generate cracks in the honeycomb mold body because the partition walls are deformed before the organic binder is heated and soften.

Still furthermore, because the manufacturing method of the present embodiment includes the cleaning step of cleaning the multi-taper jig 2, the method can avoid to perform the deformation of the partition walls 14 of the ceramic honeycomb mold body 10 to be processed in the following stage by the multi-taper jig 2 with foreign substances attached on the surface 200 of its tapered front part 20. It is thereby possible to work the partition walls 14 of the cells 13 of the ceramic honeycomb mold body 10 in a desired shape.

As described above in detail, the manufacturing method of the present embodiment according to the present invention can manufacture and provide, with a high efficiency and a low cost, the exhaust gas purifying filter having a high and superior purifying capability for purifying exhaust gas emitted from an internal combustion engine.

Second Embodiment

In the sealing and enlarging step (step S5) of the manufacturing method according to the second embodiment of the present invention, the oscillatory motion of the multi-taper jig 2 is performed along two lines that are perpendicular to each other. In the second embodiment, the maximum width of the oscillatory motion is within a range of 0.001 P to 0.5 P. Other manners of the second embodiment are the same of those in the first embodiment.

In the manufacturing method of the second embodiment, because the pressing force of the tapered front part 20 of the multi-taper jig 2 is applied to the partition walls 14 in plural directions, it is possible to form the sealed part 12 of the cells 13 in the ceramic honeycomb mold body 10 certainly, even if there is variation of the cell pitch in the arrangement of the cells 13 on the end surface of the ceramic honeycomb mold body 10.

It is acceptable that the oscillatory motion of the multi-taper jig 2 is performed along two lines that are perpendicular to each other or along three lines in different directions to each other.

As has been described above, the first embodiment shows the method of manufacturing the exhaust gas purifying filter including the jig selection step (step S4) and the sealing and enlarging step (step S5) in which the oscillatory motion of the multi-taper jig 2 is performed. However, the present invention is not limited by this manner. For example, it is possible to prevent any generation of the aperture 120 at the sealed part by using only one type of the multi-taper jig 2 without performing the jig selection step (step S4). On the contrary, it is also possible to perform only the jig selection step (step S4) of selecting the mostly optimum multi-taper jig without performing the oscillatory motion of the multi-taper jig 2 in the sealing and enlarging step (step S5).

Third Embodiment

Figure 9:
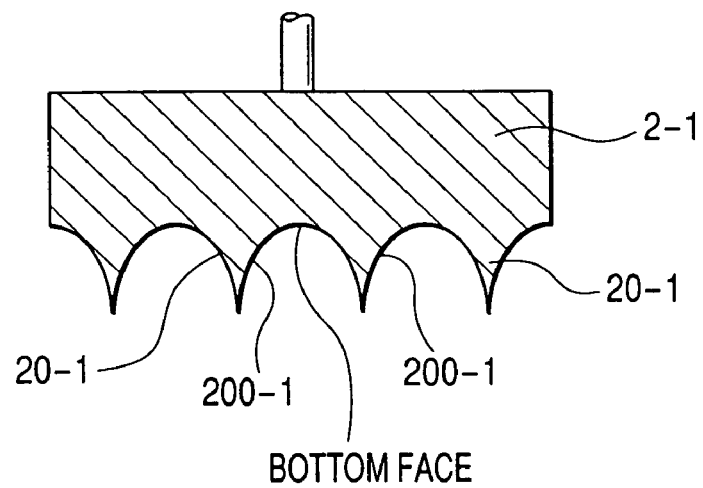
FIG. 9 is a sectional view showing another configuration of the multi taper jig of the third embodiment having a front end part in which plural curved inner surfaces are formed.
Figure 10:
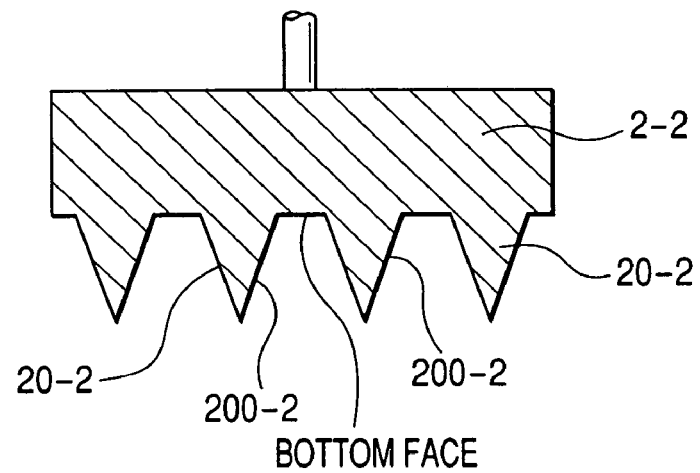
FIG. 10 is a sectional view showing another configuration of the multi taper jig of the third embodiment having a front end part in which plural trapezoid inner surfaces are formed.
Figure 11:
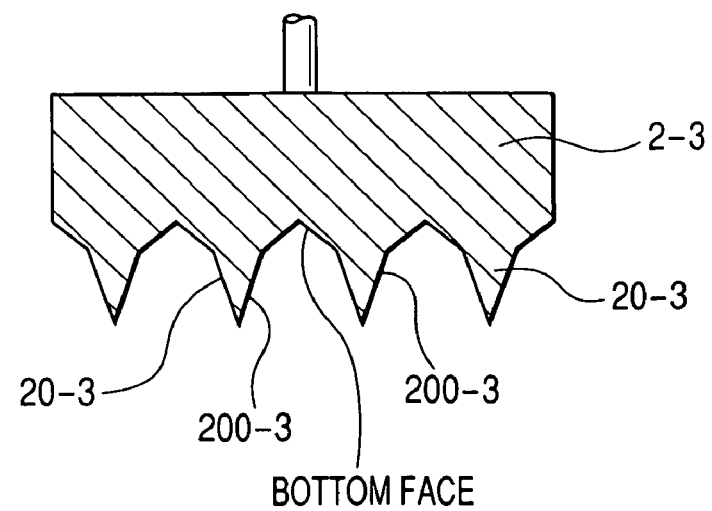
FIG. 11 is a sectional view showing another configuration of the multi taper jig of the third embodiment having a front end part in which plural polygons inner surfaces are formed.

The third embodiment of the present invention provides various types of the multi-taper jig, as shown in FIG. 9, FIG. 10, and FIG. 11.

As shown in FIG. 9, the multi-taper jig 2-1 has plural tapered front parts 20-1 with a curved surface 200-1.

Further, as shown in FIG. 10, it is possible to use the multi-taper jig 2-2 having plural tapered front parts 20-2 with a trapezoid surface 200-2.

Moreover, as shown in FIG. 11, it is possible to use the multi-taper jig 2-3 having plural tapered front parts 20-3 with a polygon surface 200-3.

The use of one of the multi-taper jigs 2-1, 2-2, 2-3 can reduce the thermal stress applied to the front part of the sealed part 12 of each cell 13, because each bottom face of the tapered front parts 20-1, 20-2, and 20-3 of the multi-taper jig does not sharp and the surface of the sealed part of each cell 13 is not sharp. It is also possible that the tapered front part of the multi-taper jig 2 has a shape of a quardrangular pyramid, a hexagon pyramid as the polygon surface, and a corn. Other features are the same as those of the first embodiment.

Fourth Embodiment

Figure 12:
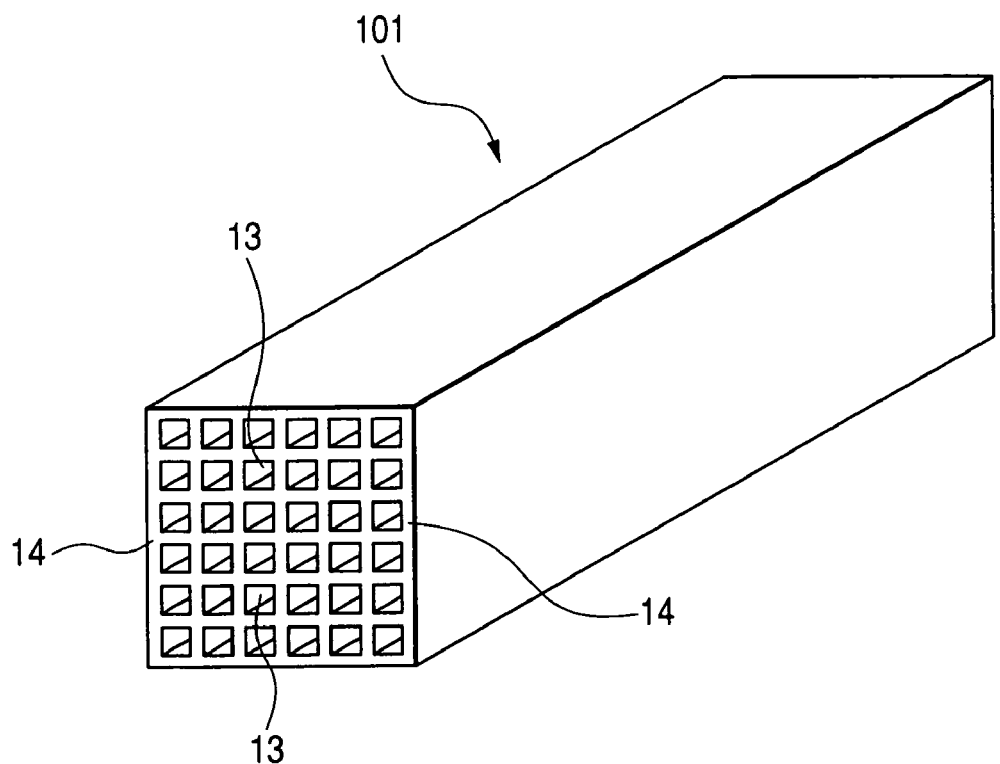
FIG. 12 is a perspective view of a honeycomb structure unit according to a fourth embodiment of the present invention.
Figure 13:
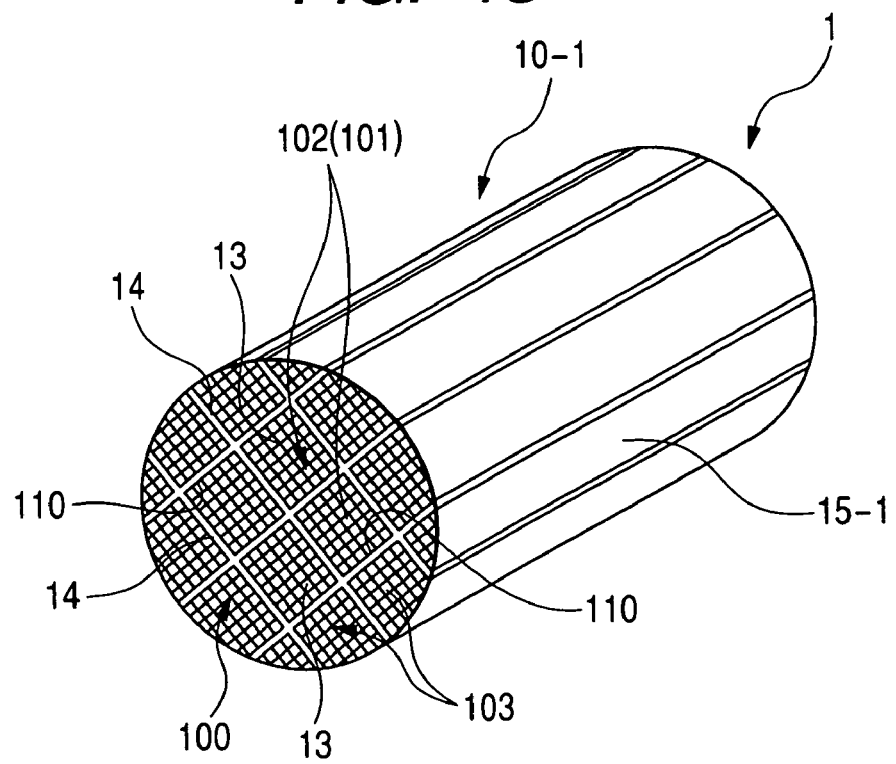
FIG. 13 is a perspective view of a honeycomb structure body according to the fourth embodiment of the present invention.
Figure 14:
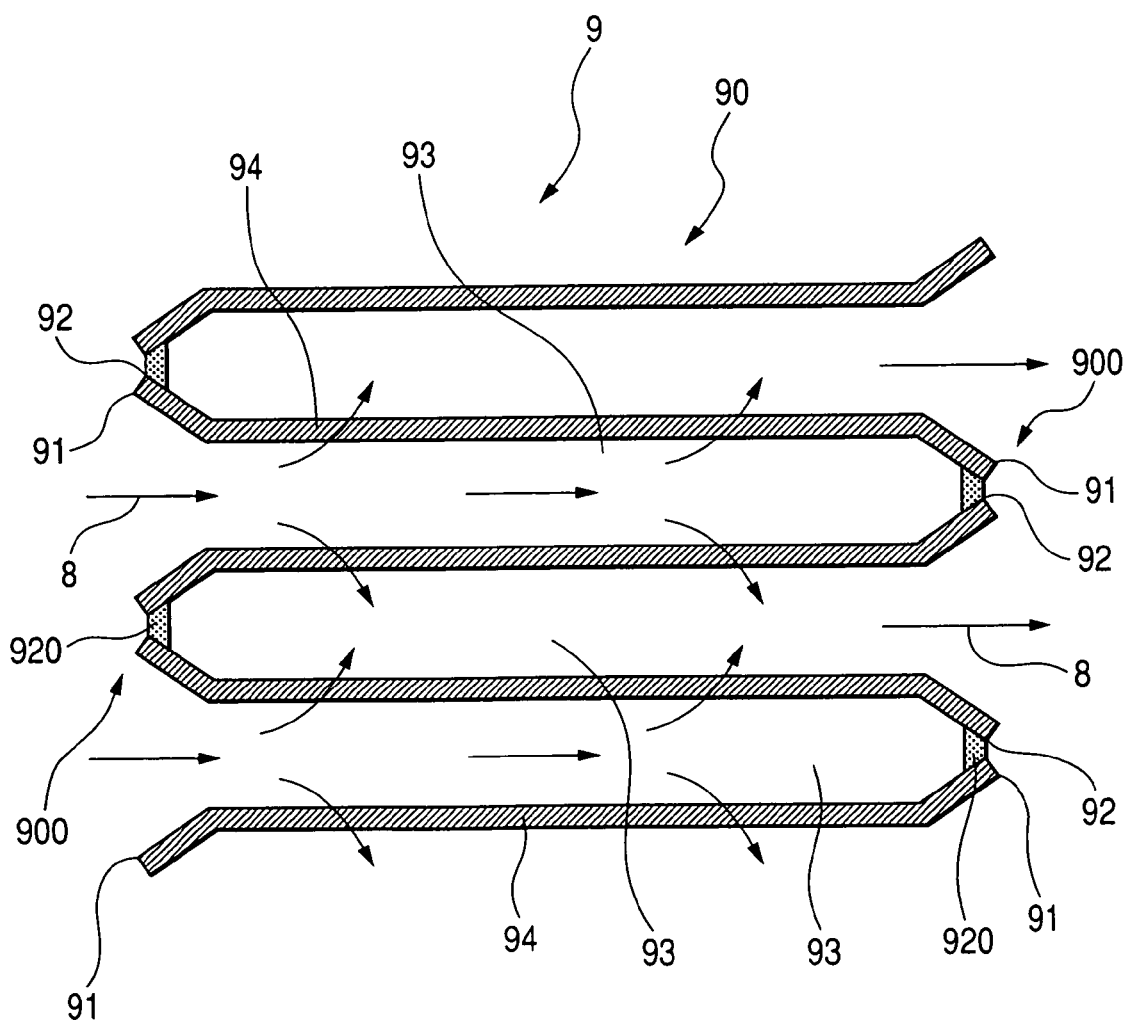
FIG. 14 is a cross section of an exhaust gas purifying filter of a related art.
Figure 15A:
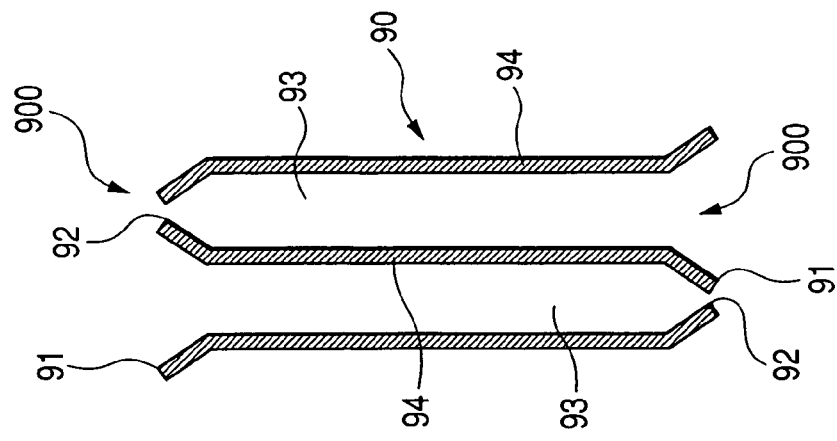
FIG. 15A is a sectional view showing the ceramic honeycomb structure body of the related art before the deformation of the partition walls.
Figure 15B:
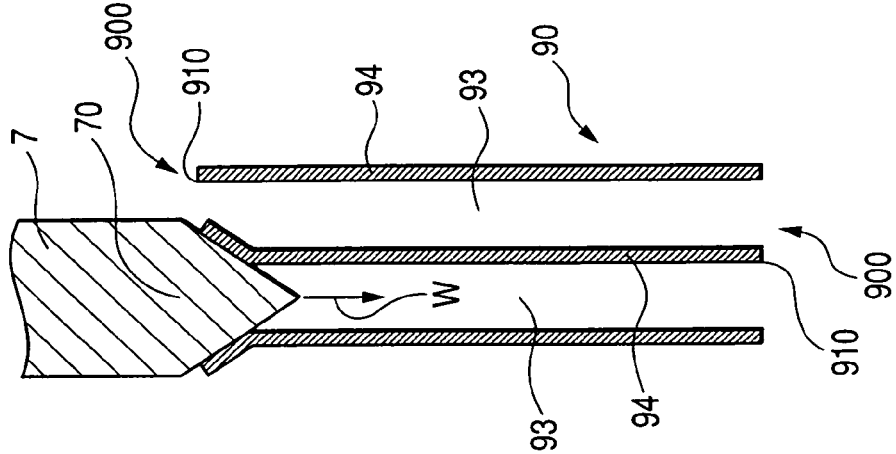
FIG. 15B is a sectional view showing the deformation of the partition walls in the ceramic honeycomb structure body of the related art.
Figure 15C:
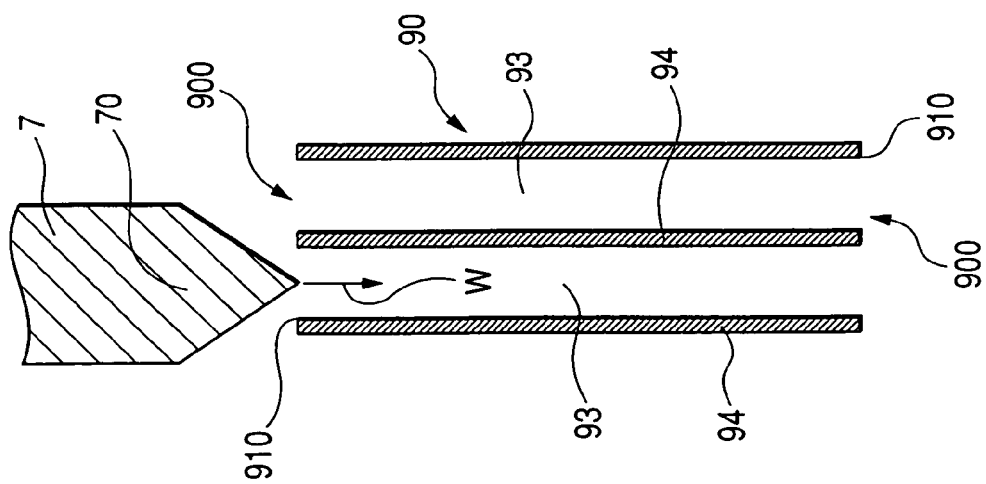
FIG. 15C is a sectional view showing the ceramic honeycomb structure body of the related art after the deformation of the partition walls.

As shown in FIG. 12 and FIG. 13, the fourth embodiment according to the present invention provides a honeycomb mold body 101 in which a plurality of the ceramic honeycomb mold bodies 10 are integrated in one body 101.

First, the ceramic honeycomb mold body 101 having a rectangle shape shown in FIG. 12 is formed. The sealing and enlarging step (step S5 shown in FIG. 8) is performed for the ceramic honeycomb mold body 101. The burning step is then performed for the ceramic honeycomb mold body 101. Finally, a plurality of the ceramic honeycomb mold bodies 101 are bonded in tight contact, the outer surface of the integrated bodies 101 is processed so that it has an envelope shape, and an external peripheral skin part 15-1 is formed on the surface of the integrated bodies 101. Other features of the fourth embodiment are the same as those of the first embodiment.

Although the plural ceramic honeycomb mold bodies 101 are bonded in tight contact after the burning step in the fourth embodiment, it is possible to bond the plural ceramic honeycomb mold bodies 101 to each other before the burning process. The burning step can enhance solidification of a bonding agent between the plural ceramic honeycomb mold bodies 101.

Further, as shown in FIG. 13, it is possible to form an integrated ceramic honeycomb mold body 10-1 by combining the ceramic honeycomb mold bodies 103 having a part of the peripheral skin part 15-1 and the ceramic honeycomb mold bodies 102 (101 shown in FIG. 13).

Still further, although the plural ceramic honeycomb mold bodies 101 are combined to each other in tight contact after the completion of the sealing and enlarging step, it is possible to perform the combined process of the plural ceramic honeycomb mold bodies 101 before the sealing and enlarging step.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A method of manufacturing an exhaust gas purifying filter, comprising steps of:

performing an extrusion molding with ceramic raw materials including organic binder in order to form a honeycomb structure body of a desired length having a plurality of partition walls forming a plurality of cells in a honeycomb structure, and both ends of each cell having openings;

inserting a multi-taper jig having a plurality of tapered front parts into the corresponding openings of a cell arrangement on one end surface of the honeycomb mold body;

oscillatory moving the multi-taper jig in a direction perpendicular to an axis of the honeycomb mold body so as to enlarge the opening of one cell and to seal the opening of the adjacent cell arranged on the end surface of the honeycomb mold body while heating the partition walls; and burning the honeycomb mold body.

2. The method of manufacturing an exhaust gas purifying filter according to claim 1, wherein the tapered front parts of the multi-taper jig is oscillatory moved while tracing a circle.

3. The method of manufacturing an exhaust gas purifying filter according to claim 1, wherein the tapered front parts of the multi-taper jig is oscillatory moved in both lines of at least two different directions to each other.

4. The method of manufacturing an exhaust gas purifying filter according to claim 1, wherein a maximum width of the oscillatory motion of the multi-taper jig is within a range of 0.001 to 0.5 times of a cell pitch of the cells of the honeycomb mold body.

5. The method of manufacturing an exhaust gas purifying filter according to claim 1, further comprising a step of measuring a cell pitch of the cells based on an image of one end surface of the honeycomb mold body after the extrusion molding, and a maximum width of the oscillatory motion of the multi-taper jig is determined based on the measured cell pitch.

6. The method of manufacturing an exhaust gas purifying filter according to claim 1, further comprising a step of measuring a longitudinal length of the honeycomb mold body after the extrusion molding step and before the sealing and enlarging step, wherein the moving length of the multi-taper jig in the axis direction of the honeycomb mold body is controlled based on the measured longitudinal length of the honeycomb mold body.

7. The method of manufacturing an exhaust gas purifying filter according to claim 1, wherein the tapered front parts of the multi-taper jig are covered with mold releasing agent.

8. The method of manufacturing an exhaust gas purifying filter according to claim 1, wherein an external diameter of the multi-taper jig is smaller than an external diameter of the honeycomb mold body.

9. The method of manufacturing an exhaust gas purifying filter according to claim 8, wherein the external diameter of the multi-taper jig is 2 to 20 mm smaller than the external diameter of the honeycomb mold body.

10. The method of manufacturing an exhaust gas purifying filter according to claim 1, wherein the partition walls to be deformed during the oscillatory motion by the multi-taper jig is heated within a temperature range of 100 to 500° C.

11. The method of manufacturing an exhaust gas purifying filter according to claim 10, wherein the partition walls to be deformed during the oscillatory motion by the multi-taper jig is heated within a temperature range of 300 to 450° C.

12. The method of manufacturing an exhaust gas purifying filter according to claim 1, wherein an inserting speed of the tapered front parts of the multi-taper jig into the openings of the cells of the honeycomb mold body is set to a range of 0.001 to 10 mm/sec during an initiation time of the insertion at which the tapered front parts of the multi-taper jig are contacted with the partition walls of the cells until a completion time of the insertion.

13. The method of manufacturing an exhaust gas purifying filter according to claim 12, wherein the inserting speed of the tapered front parts of the multi-taper jig into the openings of the cells of the honeycomb mold body is set to a range of 0.01 to 1 mm/sec.

14. The method of manufacturing an exhaust gas purifying filter according to claim 1, wherein on contacting the tapered front parts of the multi-taper jig with the partition walls of the cells, a speed of the oscillatory motion by the multi-taper jig is set to a range of 0.001 to 10 mm/sec.

15. The method of manufacturing an exhaust gas purifying filter according to claim 14, wherein the speed of the oscillatory motion by the multi-taper jig is set to a range of 0.01 to 1 mm/sec.

16. The method of manufacturing an exhaust gas purifying filter according to claim 1, further comprising a step of cleaning the tapered front parts of the multi-taper jig.

17. The method of manufacturing an exhaust gas purifying filter according to claim 1, wherein the shape of each tapered front part of the multi-taper jig is one of a quardrangular pyramid, a curved surface, a trapezoid surface, and a polygon surface.

18. A method of manufacturing an exhaust gas purifying filter for capturing particulates involved in an exhaust gas emitted from an internal combustion engine, comprising steps of:
performing an extrusion molding with ceramic raw materials including organic binder in order to form a mold body, drying the mold body, and cutting the mold body into a plurality of honeycomb mold bodies of a desired length, each honeycomb mold body having a plurality of partition walls that form a plurality of cells arranged in a honeycomb structure and both ends of each cell having openings;
inserting a multi-taper jig having a plurality of tapered front parts into the corresponding openings of the cells in an arrangement on one end surface of the honeycomb mold body;
oscillatory moving the multi-taper jig in a direction perpendicular to an axis of the honeycomb mold body so as to enlarge the opening of one cell and to seal the opening of the adjacent cell arranged on the end surface of the honeycomb mold body while softening and deforming the partition walls by heating them; and
burning the honeycomb mold body.

* * * * *